United States Patent Office 2,958,592
Patented Nov. 1, 1960

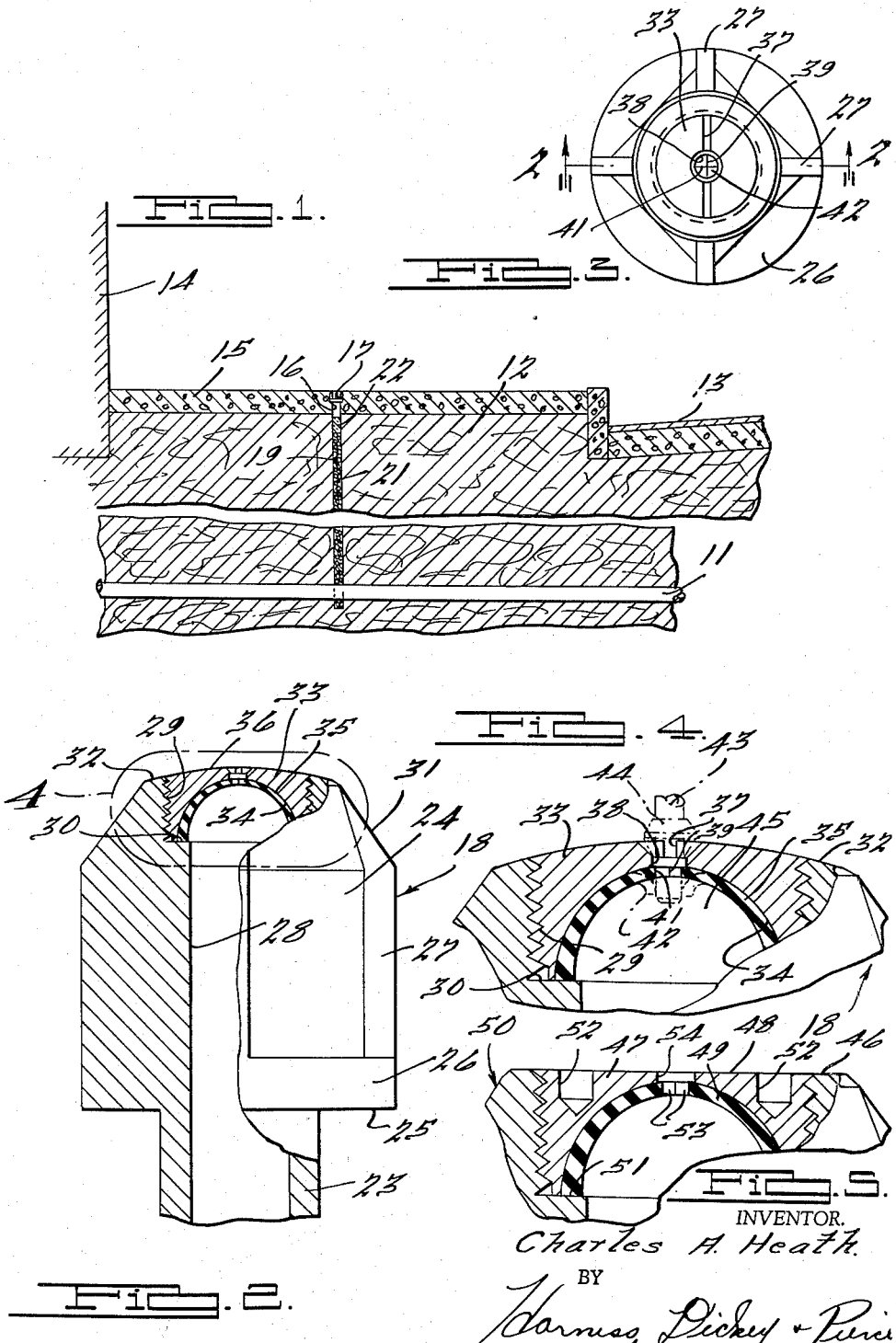

2,958,592

LEAK CONTROL DEVICE

Charles A. Heath, 33737 32 Mile Road, Richmond, Mich.

Filed Oct. 17, 1957, Ser. No. 690,739

6 Claims. (Cl. 48—193)

This invention relates to the detection of gas leaks in underground conduits, and more particularly to devices by means of which such leaks may be detected by a portable apparatus in the field.

The problem of controlling leakage of gas from underground conduits is one of continuing importance in view of the dangers that are created by the percolation of leaking gases through the soil. In the past, it has been customary to install test fixtures in the vicinity of gas mains to detect leakage, but these fixtures have required time consuming operations in order to take each sample.

It is an object of the present invention to provide a novel and improved leakage control apparatus which eliminates the need for removal of a sealing plug before taking each sample and which nevertheless provides a seal which prevents dirt or moisture from entering the test fitting when the test is not actually being taken.

It is another object to provide an improved leakage detection apparatus which may be easily located by a field inspector but will not project from the surface of the surrounding area.

It is a further object to provide an improved leakage detection device of the above character, which may also be used for purging the surrounding soil should the presence of a gas leak be detected.

It is also an object to provide an improved gas leakage detection apparatus of this nature which is of economical construction, requires little or no maintenance and may be easily installed in paved or unpaved soils.

Other objects, features, and advantages of the present invention will become apparent from the subsequent description, taken in conjunction with the accompanying drawings.

In the drawings:

Figure 1 is a cross-sectional view in elevation of a portion of pavement under which a gas main is buried, showing the manner in which the novel leakage control device is installed;

Figure 2 is a side elevational view, partly in cross section, of the major portion of the receptacle with the plug and seal mounted therein, the section being taken along the line 2—2 of Figure 3;

Figure 3 is a top plan view of the apparatus shown in Figure 2 and illustrating the configuration of the slits in the central portion of the seal for receiving the probe;

Figure 4 is an enlarged fragmentary elevational view in cross section of the area marked "4" in Figure 2 and showing in greater detail the construction of the plug and seal with a probe inserted in the seal; and Figure 5 is a fragmentary cross-sectional view in elevation of a modified form of the invention in which the plug is removable by a spanner wrench.

In general terms, the illustrated embodiment of the invention comprises a receptacle adapted to be fixed at the upper end of a hole bored into the soil above a gas conduit and into which gas leaking through the soil is likely to flow. Means are provided for securing the receptacle flush with a paved surface on top of the soil, and a plug is threadably mounted in the upper end of the receptacle, this plug having a dome-shaped interior surface and a central aperture connecting the chamber formed by this surface with the atmosphere. A cup-shaped seal made of rubber or other flexible material is disposed within the dome-shaped chamber of the plug, this seal having a pair of crossed slits immediately below the aperture. The construction is such that the seal will ordinarily provide a barrier against dirt and moisture from entering the receptacle, but may be opened by a probe inserted in the plug aperture which will spread apart the lips formed by the slits. A tubular probe may thus be used to detect gases which have collected in the receptacle, and immediately upon removal of the probe the seal lips will return to their closed position. Radioactive or magnetic material may be incorporated in the receptacle for easy detection. Should it be necessary to purge the soil in the vicinity of a leaking gas conduit, the plug may be easily removed and a conventional purge line connected to the receptacle.

Referring more particularly to the drawings, the invention is adapted to be used in conjunction with a gas conduit 11 buried some distance beneath the ground 12. The portion of the conduit shown runs between a roadway 13 and a building 14 beneath a pavement 15. It will of course be understood that the invention is applicable to conduits at other locations. In order to install the device of this invention, a hole 16 is first bored with a drill (not shown) in pavement 15. The location of this hole is preferably above conduit 11 since the soil will generally be looser above the conduit and therefore more likely to transmit leaking gases to the surface. A larger diameter hole 17 is then drilled part way through pavement 15. The respective diameters of holes 16 and 17 are such as to accommodate the receptacle of this invention which is generally indicated at 18, the receptacle and its associated parts being described in detail below. After the holes have been drilled through the pavement, a soil auger is used to drill a hole 19 through the soil to the approximate depth of the pipe, preferably to a point slightly below the bottom of the pipe as shown. Hole 19 is then filled with coarse sand, finely crushed stone or similar material 21 so that leaking gas can pass freely to the top of the hole. Filling the test hole will also serve to hold the soil in the walls of the hole in place and will provide proper drainage. The upper portion of hole 19, perhaps the top four or five inches, is packed loosely with glasswool or similar material 22 to keep the porous material 21 from being drawn out of the hole in case the test location is used for purging the soil in the area by application of a suction or vacuum.

Receptacle 18 comprises a shell-like member which may be fabricated of metal, plastic or other material that will be suitable for permanent installation at the site. The receptacle has a lower tubular portion 23 of relatively small diameter which fits within hole 16 and an upper portion 24 having a rectangular exterior surface somewhat larger than portion 23 which fits within hole 17 in pavement 15. A circular flange 25 exists between portions 23 and 24 of the receptacle, this flange being adapted to rest on the shoulder which exists between holes 16 and 17. In order to provide a flange 25 of sufficient area, the outer surface 26 of the flange may extend outwardly of rectangular portion 24. A plurality of radially extending fins 27 are formed above flange 25 to prevent receptacle 18 from rotation after it has been cemented in place. A bore 28 extends through portions 23 and 24 of receptacle 18 and terminates in an open-ended and internally threaded recess 29 at the upper end of the receptacle, a shoulder 30 being formed between bore 28 and recess 29. Fins 27 are preferably tapered inwardly at their upper ends as indicated at 31, and the receptacle has a convex surface 32 which is a continuation of the surface of a plug 33 threadably mounted in the receptacle. The relative lengths of portions 23 and 24 of receptacle 18 are preferably such that the receptacle may be mounted within holes 16 and 17 so that its upper surface 32 is approximately flush with the upper surface of pavement 15 while the lower end of portion 23 projects below the pavement.

Plug 33 is threadably mounted in recess 29, this plug having a concave recess 34 on its undersurface for the retention of a seal 35. Plug 33 may have a slightly convex upper surface 36 which is in continuation of the surface 32 of receptacle 18 when the plug is in operative position. A slot 37 is provided in the top of plug 33 for use in removing and replacing the plug, and which, as noted below, tends to make the plug self-cleaning. An aperture 38 is drilled through the center of the plug and communicates with the top of dome-shaped recess 34.

Seal 35 comprises a cup-like member of rubber, neoprene or similar resilient material and is adapted to fit within recess 34, the outer diameter of which is slightly greater than the diameter of bore 28. Preferably, the central portion of seal 34 is thinner than the outer portion, as seen best in Figure 4, the material thickness tapering outwardly from the central portion to the larger thickness. This may be accomplished, for example, by forming the outside surface of the seal on a true radius while the inside surface is so shaped as to provide the tapered thickness. Immediately below aperture 38, seal 35 is provided with two crossed slits 39 and 41, as seen best in Figure 3. These slits form four lips 42 in the central portion of seal 35, the lengths of the slits being approximately the same as the diameter of aperture 38. Seal 35 is of such size as to fit within recess 34 of plug 33 under slight pressure when the plug is tightened to force the seal against shoulder 30. This slight compression will keep lips 42 tightly closed under normal conditions.

Receptacle 18, plug 33 or both may incorporate radioactive particles or magnetic material which will enable detection of the unit by proper instruments, this being especially useful when the receptacle is installed in a field or other place which might conceal it from view, especially from a moving vehicle.

In operation, receptacle 18 will be installed in pavement 15, tubular portion 23 fitting within hole 16 in the pavement while portion 24 fits within the larger hole, the diameter of which is sufficient to accommodate fins 27. The receptacle may then be cemented in place flush with the pavement. The embedding of flange 25 and fins 27 in the cement will prevent receptacle 18 from becoming loose in any direction. When it is desired to test for the presence of gas leakage, a probe indicated at dot-dash lines at 43 in Figure 4 is inserted in aperture 38. This probe may be of a type having an internal passageway leading from its tip to an aspirator, vacuum pump or other means (not shown) for withdrawing gases, such equipment being carried by the tester or mounted on a vehicle. The probe may also have a stop 44 to prevent the probe from being inserted to a point where it will bind on the lips of the seal. An analyzing instrument such as a combustible gas indicator or an infrared gas analyzer may be utilized in conjunction with the above-mentioned withdrawal apparatus.

As the rounded nose of probe 43 is inserted in aperture 38, it will push aside the four lips 42 at the upper portion of seal 35. As stated above, these lips will normally be pressed together in contiguous relation as shown in the solid lines of Figure 4, but may be pushed aside by the probe to the dot-dash line position. The quadrant-shaped nature of these lips will permit them to be easily deflected by probe 43 so that the probe may enter chamber 45 formed by seal 35, this chamber being contiguous with passageway 28. Any gas which has collected in chamber 45 by leakage from conduit 11 and through hole 19 will thus be withdrawn by probe 43 and detected by the associated apparatus. On withdrawal of probe 43, lips 42 will return to their closed position as seen in Figure 3 and in solid lines in Figure 2, thus preventing dust or dirt from entering chamber 45. The flexibility of lips 42 is preferably such that any appreciable gas pressure built up in chamber 45 will be allowed to escape through aperture 38 by the upward deflection of lips 42 due to such gas pressure. This will prevent an undesired buildup of gas pressure beneath the soil which could cause damage to adjacent installations or property.

It should be noted that because of the tapering wall thickness of seal 35, the seal will be held firmly in place when plug 33 is tightened without impairing the flexibility of lips 42. Should it be desired to purge the soil in the area surrounding hole 19, it is merely necessary to remove plug 33 and seal 35, this being done with an appropriate tool inserted in slot 37 of the plug. A conventional purging tube may then be threadably connected to receptacle 18 by insertion into threaded aperture 29 and the gas purge through hole 19 from the surrounding soil area. During this process, the receptacle need not be disturbed and the loose material packed in hole 19 will be prevented from being extracted by the glass fiber packing 22 which will nevertheless not prevent the gas from being withdrawn. After the purging has been completed, plug 33 together with seal 35 may be replaced for further use.

Figure 5 shows a modified form of the invention which is generally similar to that of Figures 1–4 but in which the plug is removable by a spanner wrench. The receptacle is generally indicated at 50 and has a flat top 46, a plug 47 being threaded onto the top of the receptacle. Plug 47 has a flat top 48 which is flush with surface 46 when the plug is in its operative position, with seal 49 being held against shoulder 51 in the receptacle. A plurality of apertures 52 are provided in plug 47 for receiving the prongs of a spanner wrench (not shown) so that the plug may be easily removed and replaced. As in the previous embodiment, seal 49 has a plurality of lips 53, and an aperture 54 is provided above these lips for access purposes. The embodiment in Figure 5 does not have a slot similar to slot 37 of the previous embodiment, aperture 54 extending to the top of the plug.

It will thus be seen that a novel and improved device has been provided for enabling the quick and easy detection of leaking gases without the necessity of removing and reinserting a cover or other sealing member. This enables operation of a detection apparatus, for example from a car or truck, without need for the operator to get out of the vehicle and thus subjecting himself to the hazards of traffic on the roadway. The construction of the device is such that dust and dirt will be prevented from entering the chamber in which leaking gas is collected. In particular, it should be noted that the convex shape of the upper surface of plug 33 and the presence of slot 37 will tend to prevent the collection of dirt on sealing lips 42. To enhance this self-cleaning effect, the depth of slot 37 and the shape of concave recess 34 may be such that the slot and recess are practically contiguous in the vicinity of aperture 38, thus making this aperture relatively shallow. Since a slight push of the hollow probe is all that is necessary to have it enter the gas collection chamber, a lubricant will ordinarily not be necessary to spread apart lips 42. Should replacement of seal 35 be necesary, however, this may be done conveniently by removing plug 33.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. In a device for enabling the detection of gases leaking from an underground conduit, a receptacle of generally tubular shape, a flange formed on the outside of said receptacle, fins formed on said receptacle above said flange to permit the receptacle to be secured with its upper end at ground level, a passageway extending upwardly through said receptacle, a shoulder at the upper end of said passageway, a dome-shaped resilient seal resting on said shoulder and covering the upper end of said passageway, an opening formed at the central portion of said seal, a plug securable in the upper end of said receptacle and having a recess engageable with the outside of said seal, said plug when in its secured position holding said seal relatively tightly whereby said opening will be normally closed, the opening being of such shape as to enable it to be opened by a probe, and an opening in said plug above said seal opening for receiving said probe.

2. In a device for enabling the detection of leaking gases from an underground conduit, a receptacle of generally tubular shape, means for securing said receptacle with its upper end at ground level, a passageway leading upwardly through said receptacle, a dome-shaped seal of resilient material surmounting said passageway, said seal having a relatively thin wall thickness at its central portion and a relatively thick wall thickness at its peripheral portions, a pair of crossed slits in the central portion of said seal, said slits forming four lips therebetween, a plug mounted in the upper end of said receptacle and having a recess engageable with the outside of said seal, said plug when in position holding said seal tightly within said receptacle, whereby said lips will normally be in closed position, and a probe-receiving aperture in said plug disposed above said lips.

3. In a device for detecting the presence of gas under ground, a receptacle adapted to be mounted in an opening in the ground and maintained at substantially ground level, said receptacle having a passageway therein for receiving the collected gas, and a seal of resilient material disposed in said passageway, said seal having a heavy side wall defining a central passageway open at one end and having a thin portion of the material closing the top thereof, said thin portion having lips retained normally in sealed relationship but which are spread apart by a probe when collecting a sample of gas therebelow from within the passageway.

4. In a device for detecting the presence of gas under ground, a receptacle adapted to be mounted in an opening in the ground and maintained at substantially ground level, said receptacle having a passageway therein for receiving the collected gas, a seal of resilient material disposed in said passageway, said seal having a heavy side wall defining a central passageway open at one end and having a thin portion of the material closing the top thereof, said thin portion having lips retained normally in sealed relationship but which are spread apart by a probe when collecting a sample of gas therebelow, and a plug screwed into said receptacle for retaining said seal therein, said plug having a central aperture aligned with the lips in said thin top area.

5. In a device for detecting the presence of gas under ground, a receptacle adapted to be mounted in an opening in the ground and maintained at substantially ground level, said receptacle having a passageway therein for receiving the collected gas, a seal of resilient material disposed in said passageway, said seal having a heavy side wall defining a central passageway open at one end and having a thin portion of the material closing the top thereof, said thin portion having lips retained normally in sealed relationship but which are spread apart by a probe when collecting a sample of gas therebelow, and a plug screwed into said receptacle for retaining said seal therein, said plug having a central aperture with thin walls adjacent thereto and with the aperture aligned with the lips in said thin top area, with the metal of the plug arched downwardly from said aperture to prevent the water from collecting thereon and rendering the device ineffective in freezing weather.

6. In a device for enabling the detecting of leaking gases from an underground conduit, a receptacle of generally tubular shape to provide a passageway leading upwardly therethrough, the outer surface of said receptacle having a configuration thereon for mounting the receptacle in an opening in the ground at substantially ground level, a seal of resilient material disposed in said passageway, said seal having a relatively thick wall thickness at its peripheral portion and a relatively thin wall at its central portion, said relatively thin central portion having mating lips which are normally retained engaged in sealed relation but which are separated by a probe when extended downwardly thereinto for obtaining a sample of the gas collected therebelow, and a plug secured on the upper end of said receptacle for retaining said seal therein, said plug having a central aperture therein aligned with said lips for receiving said probe.

References Cited in the file of this patent

UNITED STATES PATENTS

| | | |
|---|---|---|
| 1,865,764 | Keenan | July 5, 1932 |
| 2,349,463 | Riddle | May 22, 1944 |
| 2,605,784 | Snyder | Aug. 5, 1952 |
| 2,658,434 | Miller | Nov. 10, 1953 |
| 2,688,979 | Kendrick | Sept. 14, 1954 |

FOREIGN PATENTS

| | | |
|---|---|---|
| 337,879 | Great Britain | Nov. 13, 1930 |
| 341,440 | Great Britain | Jan. 7, 1931 |